United States Patent [19]

Bailey et al.

[11] 4,362,545
[45] Dec. 7, 1982

[54] SUPPORT MEMBER FOR AN OPTICAL WAVEGUIDE PREFORM

[75] Inventors: Alan C. Bailey; Stephen B. Miller, both of Painted Post, N.Y.

[73] Assignee: Corning Glass Works, Corning, N.Y.

[21] Appl. No.: 237,852

[22] Filed: Feb. 25, 1981

Related U.S. Application Data

[62] Division of Ser. No. 165,649, Jul. 3, 1980, Pat. No. 4,289,522.

[51] Int. Cl.³ .................... C03B 19/06; F16L 25/00
[52] U.S. Cl. ........................................ 65/169; 65/375; 118/728; 403/34
[58] Field of Search .............. 65/144, 157, 171, 18.2, 65/13, 3.12, 169, 375; 118/729, 730, 732, 728; 403/34

[56] References Cited

U.S. PATENT DOCUMENTS

| | | | |
|---|---|---|---|
| 3,933,454 | 1/1976 | DeLuca | 65/3.12 |
| 4,125,388 | 11/1978 | Powers | 65/3.12 |
| 4,126,436 | 11/1978 | Bailey | 65/13 |
| 4,154,592 | 5/1979 | Bailey | 65/13 X |
| 4,157,906 | 6/1979 | Bailey | 65/3.12 |
| 4,165,223 | 8/1979 | Powers | 65/3.12 |
| 4,204,850 | 5/1980 | Dominick et al. | 65/3.12 |

*Primary Examiner*—Richard V. Fisher
*Attorney, Agent, or Firm*—Walter S. Zebrowski

[57] ABSTRACT

An article suitable as an integral handle for an optical waveguide preform is disclosed. The article comprises a hollow tubular member defining a substantially longitudinal aperture and having one end thereof tapered and of diminishing wall thickness for the length of said taper. Adjacent the tapered end is disposed an outwardly extending protrusion which is embedded in one end of an optical waveguide preform forming an integral unit therewith. Means are provided for a substantially gas-tight connection to the handle so that a gaseous medium may be flowed through the handle and the optical waveguide preform in its porous soot form. Means are also provided for attaching and securing the composite structure to a source of gaseous medium. Also disclosed is the combination of an optical waveguide preform rigidly affixed to a handle.

20 Claims, 6 Drawing Figures

SUPPORT MEMBER FOR AN OPTICAL WAVEGUIDE PREFORM

CROSS-REFERENCE TO RELATED APPLICATIONS

This is a divisional application of Ser. No. 165,649 filed on July 3, 1980 now U.S. Pat. No. 4,289,522. Reference is also made to our copending applications Ser. No. 165,650 (now U.S. Pat. No. 4,289,517), entitled "Method of Forming An Optical Waveguide Preform," and Ser. No. 165,651 (now U.S. Pat. No. 4,286,978) entitled "Method For Substantially Continuously Drying, Consolidating and Drawing An Optical Waveguide Preform," both filed July 3, 1980. Further, reference is made to Ser. No. 155,422 filed by M. G. Blankenship on June 2, 1980 and entitled "Method and Apparatus For Forming An Optical Waveguide Preform Having A Continuously Removable Starting Member."

BACKGROUND OF THE INVENTION

This invention relates to an article suitable as a support member for an optical waveguide preform, and more particularly to an optical waveguide preform support member formed as an integral part of the preform body.

Optical waveguides, which are the most promising medium for transmission of high frequencies, normally consist of an optical filament having a transparent core surrounded by a transparent cladding having a refractive index which is lower than that of the core. A very thorough and complete discussion concerning operational theories of optical waveguides is contained in U.S. Pat. No. 3,157,726 issued to Hicks et al., and in the publication "Cylindrical Dielectric Waveguide Modes" by E. Snitzer, Journal of the Optical Society of America, Vol. 51, No. 5, pp. 491–498, May 1961. Other excellent sources of information concerning optical waveguides are "Fiber Optics—Principles and Applications" by N. S. Kapany, Academic Press, 1967, as well as "Fundamentals of Optical Fiber Communications" edited by Michael K. Barnoski, Academic Press, 1976.

Generally optical waveguides are made by either outside or inside vapor phase oxidation as hereinafter more particularly defined. The present invention is particularly suitable to the formation of optical waveguide preforms by the outside vapor phase oxidation process where a starting rod or tube is used as a starting member, bait, or mandrel, on the outside surface of which is deposited one or more layers of suitable material. Ordinarily, the starting member or mandrel is removed leaving the deposited structure as a preform for the subsequent waveguide. Where a tube is employed as a starting member and is either left in place or removed, a center hole exists in the same manner as if a solid rod was removed from the deposited material. The center hole must thereafter be closed before or during drawing and a solid elongated waveguide filament drawn. In the outside process, either the starting rod forms the core of the ultimate waveguide or the first deposited layers form the core of the ultimate waveguide, while the latter deposited layers form the cladding thereof.

When a starting member or mandrel is used and is intended to remain with the structure to ultimately form the core of the waveguide, substantial exterior surface preparation such as cleaning, smoothing, or the like is necessary before deposition thereto may take place. In addition, if the starting member or mandrel is intended to remain and become the core of the waveguide, it must be a very high purity glass, and have optical properties equivalent to the quality of the waveguide core, for example, low signal attenuation and equivalent index of refraction. However, when the starting member or mandrel is removed, other problems are presented. Among these problems are that the preform is free standing such that handling and further processing of the preform is made more difficult. For example, when the starting member or mandrel is removed the resulting preform is a porous structure having a central aperture. Such a porous structure must thereafter be consolidated into a solid structure and the central aperture must be closed either by drawing or other preliminary processing well known in the art. Handling of such a porous structure during consolidation and subsequent drawing and/or hole closing requires special preparation and handling. One manner for preparing the porous preform for consolidation is to drill a hole through the structure perpendicular to the longitudinal axis thereof near one end of the structure to permit a platinum wire, or the like, to be passed through the drilled hole for hanging the preform vertically during consolidation. Unfortunately, however, the porous preform is structurally vulnerable during such drilling operation and frequently leads to the destruction of the preform due to lengthwise splits or cracks and always allows liberated soot from the drilling to contaminate the center hole of the preform.

DESCRIPTION OF THE PRIOR ART

No prior art directed to the formation of an optical waveguide preform wherein a hollow preform handle or member is embedded within the preform during the formation thereof and remains with the preform during subsequent handling and processing, while the starting member upon which the preform has been deposited is removed, is known to exist. However, some of the following art includes reference to the formation of an optical waveguide preform in connection with the fabrication of optical waveguides.

U.S. Pat. No. 3,884,550 to Maurer et al. teaches the formation of a large solid blank or boule from which rods, which are intended to form the starting member, are core drilled and thereafter ground and polished. Such rods are high purity and high optical quality glass if they are intended to be left as a core material of the ultimate optical waveguide. This reference also teaches a starting member formed by normal glass melting but cautions that such member may have an excessive impurity level and must ultimately be removed.

The stringent optical requirements placed on the transmission medium that could be employed in optical communication systems has negated the use of conventional glass fiber optics, since attenuation therein due to both scattering and impurity absorption is much too high. Since pure fused silica has the lowest known optical attenuation of any glass in the red and near infrared portion of the spectrum where optical communications appear most promising, pure fused silica and doped fused silica were among the earliest considered materials for use in the fabrication of optical waveguides. For example, single mode optical waveguides have been formed by inserting a titania doped silica fiber into a silica capillary. The tubing was heated and collapsed onto the central fiber, and the resulting cane was redrawn to waveguide dimensions. Waveguides produced in this manner are sometimes unsatisfactory since numerous tiny air bubbles and particles tend to form on the core-cladding interface resulting in light scattering sites and core diameter variations leading to very high attenuation.

U.S. Pat. No. 3,737,292 issued to D. B. Keck et al., teaches forming a starting member by grinding out or core drilling the member from a solid blank or boule. The outside surface of this cylindrical starting member is carefully polished and cleansed to remove surface irregularities and contaminations which might later cause light scattering. Surface polishing may be achieved by mechanical polishing, fire polishing, laser milling, or the like. This patent teaches a particularly suitable method of smoothing the outside surfaces of the cylinder by first mechanically polishing and thereafter flame polishing the mechanically polished surfaces. Hydrofluoric acid washing of all surfaces is performed before and after all polishing operations to avoid contamination. This patent teaches that, since the starting member is ultimately removed, it need be formed only of material having a composition and coefficient of expansion compatible with the waveguide cladding and core material thereafter deposited. This patent further teaches that the material does not need high purity and it may be formed of normally produced glass having ordinary or even excessive levels of impurities or entrapped bubbles that would otherwise render it unsuitable for effective light propagation. Alternately, the patent teaches that the starting member may be formed of graphite or the like.

U.S. Pat. No. 3,775,075 issued to D. B. Keck et al. teaches a starting member formed in a manner very similar to that described in U.S. Pat. No. 3,737,292 hereinabove noted. A difference from the hereinabove described patent is that in this reference the starting member is not removed and forms the core of the ultimate waveguide wherein purity of the material and surface treatment of the core member is particularly significant.

Removable mandrels or starting members are taught in U.S. Pat. No. 3,806,570 issued to Flammenbaum et al. In this patent, the starting member or mandrel is taught to be a non-metallic dense material having a thermal expansion characteristic of less than $\alpha 0-10-00 \simeq 30 \times 10 - 7/°$ C. and a melting point above approximately 1400° C. Such a material is illustrated as graphite, fused quartz, glass-ceramic, or any crystalline refractory ceramic having low expansion characteristics such as $Al_2O_3$, mullite, BN, SiC, and the like.

A known method of producing a conventional optical fiber is disclosed in U.S. Pat. No. 3,227,032 to L. O. Upton. This method comprises inserting a rod of glass possessing the desired core characteristics into a tube of glass possessing the desired cladding characteristics. The temperature of this combination is then raised until the viscosity of the material is low enough for drawing. The combination is then drawn until the tube collapses around and fuses to the inside rod. This resulting combination rod is then further drawn until its cross-sectional area is decreased to the desired dimensions. This method is normally used to produce optical fibers having large core and thin outside cladding. As for example, the total diameter to core diameter ratio of such a fiber might be 8:7.

A removable mandrel for use in connection with forming optical waveguide preforms is described in U.S. Pat. No. 3,933,453 issued to G. E. Burke et al. According to this patent, a glass layer is formed at a high temperature on a mandrel which includes a support rod or tube on which is disposed a layer of refractory metal wire, gauze, foil or the like. The mandrel is so constructed that stresses which theretofore have developed in the glass layer during cooling, are avoided, and the mandrel is easily removed from the glass layer, thereby forming a hollow glass cylinder that is free from cracks, checks and the like.

U.S. Pat. Nos. 4,126,436 and 4,154,592, both issued to A. C. Bailey, teach a means for holding an optical waveguide preform from which the starting mandrel or bait has been removed. These patents teach that the blank can be flame-worked or otherwise shaped whereby one end is tapered to facilitate the starting of the draw while the other end is provided with a neck which fits into a handle. The handle comprises a rod and a slotted glass portion at the end thereof into which the preform is secured. The preform may then be introduced into the drawing apparatus by means of such a handle.

A further illustration of attaching a handle to an optical waveguide preform is illustrated in U.S. Pat. No. 4,157,906 issued to A. C. Bailey. In this patent, the starting mandrel or bait is removed. Thereafter, a handle is formed consisting of a low expansion glass tube to which a short length of smaller diameter tubing is attached. The patent teaches that quartz is a particularly suitable material for the tubing since it can withstand the 1600°–1850° C. draw temperature without excessive distortion, and since it does not add impurities to the preform. Small bumps are flame worked into opposite sides of the end of the quartz tube which is thereafter inserted into the soot preform within the aperture formed by removing the starting mandrel or bait. After the tube is inserted, it is rotated about 90° to lock it into the preform by means of the bumps formed on the outside surface thereof. This patent also teaches that loose soot caused by the insertion of such a separate handle into the preform must be removed from the outside and inside surfaces of the preform before it is consolidated and drawn.

A further illustration of attaching a handle to a preform is illustrated in U.S. Pat. No. 4,165,223 issued to D. R. Powers. This patent teaches forming a porous soot preform on a starting mandrel or bait which is subsequently removed. After the starting member is removed, the preform is suspended from a tubular support by means of two platinum wires. Holes must be drilled through the upper portion of the porous preform to permit the insertion of the platinum wires therethrough. The wires are thereafter affixed to the tubular support member at a point above where an extending boss is formed in the support member. The lower portion of the support member comprising a gas conducting tube is inserted into the porous preform in the aperture remaining after the starting member or bait is removed.

A means for pretreating the starting member or bait prior to the formation of a preform for an optical waveguide is illustrated in U.S. Pat. No. 4,204,850 issued to E. K. Dominick et al. This patent teaches applying a carbon coating over the starting mandrel or bait after which the preform is built up on the starting mandrel. The carbon coating permits easier removal of the starting member and produces a smooth improved inner surface in the preform thereby eliminating flaws which otherwise may be present when the preform is drawn into a waveguide. All of the preceding patents, books, publications or articles are hereby expressly incorporated herein by reference.

As used herein, vapor phase oxidation includes "chemical vapor deposition" and other vapor phase oxidation methods. The phrase "chemical vapor deposition" means the formation of deposits by chemical reactions which take place on, at or near the deposition surface, a definition set forth on page 3 of the text "Vapor Deposition" edited by C. F. Powell et al., New York, John Wiley & Sons, Inc., 1966, which text is hereby wholly expressly incorporated by reference. Any other procedural variations well known in the art may be employed to affect the deposition of a suitable coating of glass by the chemical deposition process.

Effective means for applying coatings by vapor phase oxidation is to sinter a soot layer of the desired material applied by the "flame hydrolysis" process, as hereinafter defined, similar to that described in U.S. Pat. No. 2,272,342 issued to J. F. Hyde or U.S. Pat. No. 2,326,059 issued to M. E. Nordberg, both of which patents are expressly incorporated herein by reference.

As will be understood, glass for optical waveguides is commonly formed by entraining a vapor in a carrier gas which is supplied to a deposition burner. The gas is reacted to deposit a soot of finely divided material. Early literature refers to the chemical process which is that of the Nordberg and Hyde patents, as flame hydrolysis. Recently, however, workers in the field have come to recognize that the chemical process is not hydrolysis but rather is oxidation. The "Handbook of Chemistry and Physics" describes oxidation as a process which increases the proportion of oxygen or acid forming elements in the compound. On the other hand, hydrolysis is defined as a reaction involving the splitting of water into its ions in the formation of a weak acid or base, or both. The definition of oxidation better describes the process which occurs in vapor deposition processes of this type. In any event, the burner is used in the prior art in the same way. The term "oxidizing" is used herein in the alternative for hydrolyzing because it more precisely describes the chemical process involved. The resultant product is the same regardless of the term used to describe the process.

"Soot" member, article, structure or preform as used herein is defined as a member, article, structure or preform formed of soot particles adhered to adjacent particles but not sintered or consolidated, namely a porous unconsolidated structure.

SUMMARY OF THE INVENTION

It is an object of this invention to provide an article or handle suitable for permitting handling and/or subsequent processing of a porous soot preform and the article or handle is firmly attached to the preform.

Another object of this invention is to provide an article or handle for a porous soot preform suitable for optical waveguides wherein the preform may be easily and firmly handled, and processed without deleterious affects upon the preform, and one which overcomes the disadvantages heretofore noted.

Briefly, according to this invention, an article or handle suitable for permitting handling and processing of a porous soot preform for optical waveguides is disclosed. The article or handle comprises a hollow tubular member which has an outwardly extending protrusion disposed adjacent one end of the member. Means for providing a substantially gas-tight connection to the member or handle is disposed at the end of the member opposite said one end whereby a gaseous medium may be flowed through said member. Also provided are means intermediate the protrusion and the opposite end for securing the member to a source of gaseous medium. The hollow tubular member is adapted to permit a starting member or bait to be inserted therethrough and extended beyond said one end. The starting member or bait may be coated with a release layer such as carbon. Thereafter, particulate soot material is applied to the starting member or bait extending over said one end of the hollow tubular member until a preform of desired size and shape, as well as composition, is formed. Thereafter, the starting member or bait is removed leaving the hollow tubular member integrally associated with the porous soot preform forming an integral handle therefor.

These and other objects, features and advantages of the present invention will become apparent to those skilled in the art from the following detailed description and the attached drawings, on which, by way of example, only the preferred embodiments of this invention are illustrated.

DETAILED DESCRIPTION OF THE INVENTION

It is to be noted that the drawings are illustrative and symbolic of the present invention and there is no intention to indicate scale or relative proportions of the elements shown therein. For the purposes of simplicity, the present invention will be described in connection with the formation of optical waveguide preforms and the waveguides themselves although this invention is not intended to be limited thereto.

Figure 1:
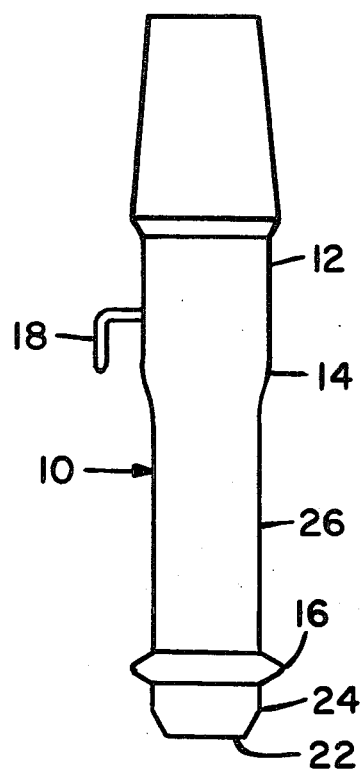
FIG. 1 is an elevational view illustrating one embodiment of the article of the present invention.

Referring to FIG. 1, there is shown an article or handle 10 of the present invention suitable as an integral handle for a porous soot optical waveguide preform. Handle 10 may be formed by providing a standard-taper fused silica male ground glass joint member, such as that supplied by Quartz Scientific Corporation of Fairport Harbor, Ohio under Catalog No. QTJ-14/35-male. As received, such ground joint members have as an integral part thereof a fused silica tubing of approximately 13 mm outside diameter and over 5 inches long extending from the ground joint end. All but about 30 mm of this fused silica tubing is cut off and the male ground end secured into a complimentary female ground joint member also supplied by Quartz Scientific Corporation under Catalog No. QTJ-14/35-female. The thus completed assembly is then installed into one chuck of a lamp working lathe. A sufficient length of clear fused quartz tubing having an inside diameter of approximately 7 mm and an outside diameter of approximately 9 mm is secured in the other chuck of the lathe. Fused quartz tubing of these dimensions appears to be particularly suitable to closely fit over the starting mandrel or bait rod and minimizes the intersection region between the starting mandrel or bait rod and the integral handle which must subsequently be filled in by soot particles as hereinafter described. It is to be noted that the dimensions and sizes herein set forth are not critical but merely illustrative of one embodiment of the present invention and form no part of the present invention.

The fused quartz tubing is then abutted the modified male ground glass joint member 12 and a smooth butt seal 14 is effected. In making butt seal 14, care should be taken to assure that the two sections are aligned along their longitudinal axis and that the inside diameter of the fused silica tubing is not decreased. Once the seal is made, an outwardly extending protrusion or enlargement 16 having an outside diameter of approximately 13 to 14 mm is made at a point approximately 95 mm from the ground joint end. As will be understood, this outwardly extending protrusion 16 will subsequently be covered by soot particles and will prevent the ultimately formed preform and integral handle from separating after the deposition is completed as hereinafter described.

Beyond the outwardly extending protrusion 16, the fused silica tubing is heated and allowed to shrink somewhat in diameter until the inside diameter thereof is somewhat smaller than the outside diameter of the starting mandrel or bait rod to be used.

Thereafter, a means such as a small hook 18 is fused to the outside of handle 10 at a point intermediate the ground joint surface and the outwardly extending protrusion 16, approximately 50 mm from the ground joint end. The assembly so formed is then removed from the lathe, allowed to cool, and the unused portion of the fused silica tubing is cut off.

Figure 2:
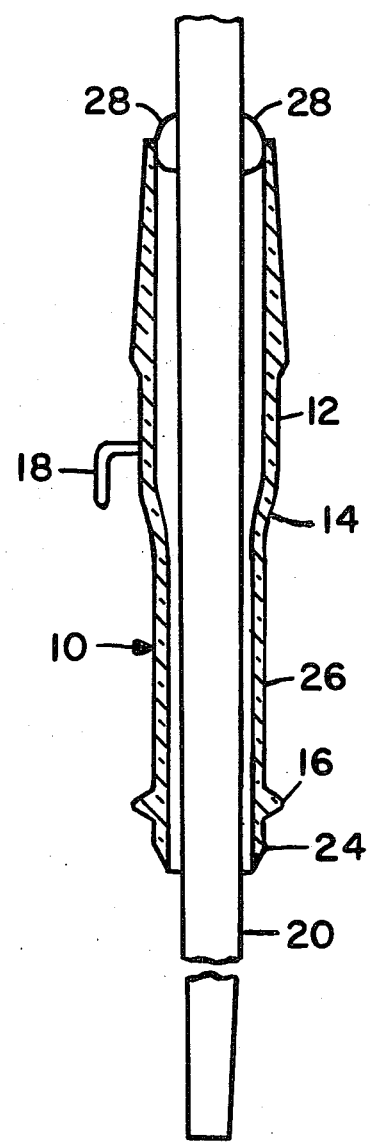
FIG. 2 is an elevational view, partly in cross-section, of the combination of a starting member fitted into a handle.

Referring additionally to FIG. 2, a starting mandrel or bait rod 20 is preferably slightly tapered from one end to the other although an untapered bait rod may also be used. For example, in the center region where the soot particles will ultimately be deposited, the taper may range from 5.5 mm at the small end to 6.5 mm at the large end. The small end of the starting mandrel or bait is inserted through the ground joint end of the handle and the clearance between the handle and the starting mandrel is monitored. Very small amounts of handle 10 are ground off repeatedly from the flame-narrowed end of the handle at surface 22 until the outside surface of starting mandrel 20 makes contact with the inner surface of handle 10 at a point where the starting mandrel extends approximately 50 to 100 mm beyond the farthest edge of the soot deposition region. When the handle is properly positioned in the soot deposition region, a very small gap of approximately 0.1 mm will exist between starting mandrel 20 and the flame-narrowed end of holder 10 to allow for expansion of the starting mandrel upon heating. The tip of handle 10 is then carefully tapered with a Carborundum wheel to form taper 24. To prevent stress concentrations at the point where starting mandrel 20 protrudes from handle 10, taper 24 should be formed so that the wall thickness at surface 22 is as small as possible, preferably a feathered edge. In this manner, the fused silica tubing sealed to the modified ground glass joint member 12 comprises integral extension 26 of handle 10.

After starting member 20 is fitted at the small end of handle 10 at taper 24, the ground joint end is secured by disposing shims 28 in the space between starting mandrel 20 and handle 10. Shims 28 may be formed of any suitable material such as fiber glass tape, glass electrical tape, metal, or the like. Such shimming should be done such that starting mandrel 20 is securely maintained within handle 10 at the ground joint end thereof but should not form a gas-tight seal. Shims 28 should be spaced such that apertures or channels are provided to permit the escape of gaseous material during at least a portion of the time that the subsequent soot deposition will take place.

Suitable materials for starting mandrel 20 may be alumina, quartz, graphite, silicon carbide, or the like. Suitable materials for handle 10 may be quartz, fused silica, refractory material, or the like. The materials of both of these elements must be compatible with each other and with the ultimate soot material being deposited.

Figure 3:
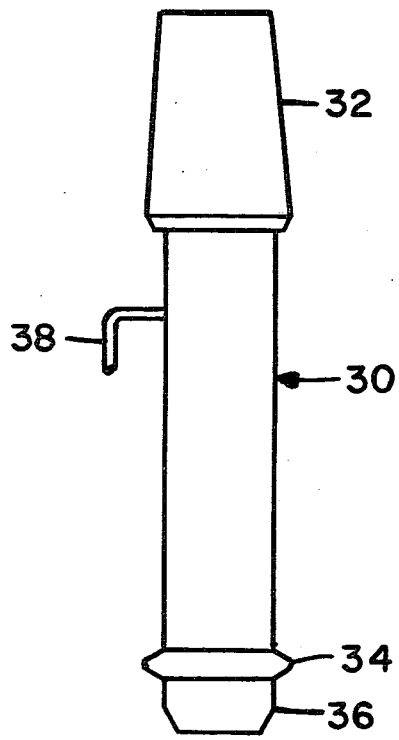
FIG. 3 is an elevational view of another embodiment of the article of the present invention.

FIG. 3 illustrates another embodiment of the integral, optical waveguide preform handle of the present invention wherein handle 30 comprises a ground glass joint portion 32, an outwardly extending protrusion or enlargement 34, a tapered section 36 and a hook 38. In this embodiment handle 30 may be made from substantially one piece of material or an extension to the ground glass joint portion may be of the same diameter as the ground glass joint portion and butt sealed thereto. Otherwise, handle 30 is fitted with a starting mandrel as described in connection with FIGS. 1 and 2.

Figures 4, 5:
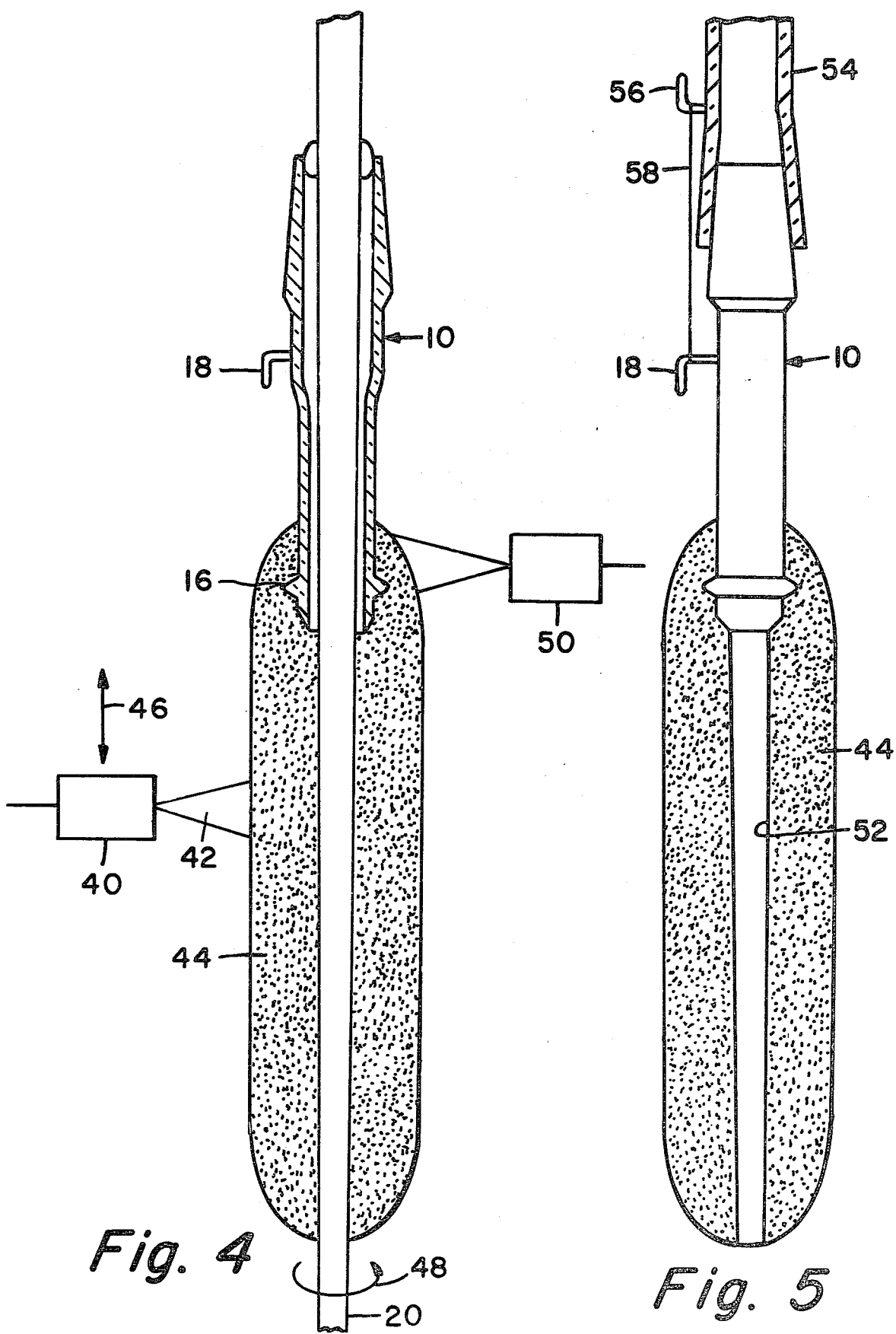
FIG. 4 is an elevational view partly in cross-section illustrating the formation of a porous soot preform employing the present invention.
FIG. 5 is an elevational view partly in cross-section illustrating a finished soot preform wherein the article of the present invention forms an integral part thereof.

Handle 10 fitted with starting mandrel 20, as hereinabove described, is now suitable for deposition of soot thereon as illustrated in FIG. 4. As a further step in the preparation of such an assembly, a release agent, such for example as a carbon coating, may be applied to starting mandrel 20 and the extending portion of handle 10. For an illustration of a suitable coating means, coating and method, reference is made to U.S. Pat. No. 4,204,850 issued to E. K. Dominick et al. which teaches the application of a carbon coating. This patent is hereby expressly incorporated herein by reference. The assembly may then be mounted by means of starting mandrel 20 in a glass deposition lathe or any other deposition apparatus well known in the art.

Particulate material or soot which will ultimately form the porous article of the present invention, such as for example, an optical waveguide preform, is then deposited by means of one or more burners 40 over the extending portion of handle 10 including outwardly extending protrusion or enlargement 16 and that portion of starting mandrel 20 over which it is desired to deposit such soot or particulate material. Any burners which provide a stream of particulate material that can be directed to starting mandrel are suitable for the present purposes. For an illustration of a suitable burner, reference is made to U.S. Pat. No. 3,565,345. It will be understood that the terms "burner" or "burners" as used herein shall not be limited to burners as described above, rather shall include all other means suitable for generating and depositing particulate or soot material and including means for non-fuel fired heating of particulates using electrical resistance heating, plasma heating, induction heating and the like.

The particulate material 42 which forms the soot coating over handle 10 and starting mandrel 20 may be any suitable material, as for example, in the formation of an optical waveguide preform, materials suitable for the core and cladding of an optical waveguide. Suitable means for delivering constituents to burner 40 may be any means known in the art, for an illustration of which reference is made to U.S. application Ser. No. 872,619 filed Jan. 26, 1978, now U.S. Pat. No. 4,212,663, by M. A. Aslami and U.S. Pat. No. 4,173,305 to M. G. Blankenship, which application and patent are hereby expressly incorporated by reference.

It will be understood that the fabrication process in part described herein contemplates that the article being formed is disposed horizontally with particulate deposition occurring along a portion of the length of starting mandrel 20 and the extending portion of handle 10, however, the present invention also contemplates and includes vertical deposition as illustrated in the Figures. In the latter situation handle 10 and starting mandrel 20 would, of course, be mounted and disposed in a generally vertical direction.

Ordinarily, particulate material 42 is applied in a plurality of layers to form porous soot preform 44. As will be understood, burner or burners 40 are translated in the direction of arrows 46 while handle 10 and starting mandrel 20 are rotated as illustrated by arrow 48 to achieve deposition of the composition, uniformity, and size desired. It will also be understood that the burners may be stationary while handle 10 and starting mandrel 20 are translated and rotated, or the burners may be rotated or be ring burners while either the burners or handle 10 and starting mandrel 20 are translated. The present invention contemplates any combination of translation and rotation of the burners and the starting mandrel and handle so long as the deposition of the particulate material and its composition, uniformity and size is achieved as desired.

Depending on the material being deposited and the materials of handle 10 and starting mandrel 20, it is sometimes preferred to provide heat from an auxiliary burner 50 in the general location of the intersection between handle 10 and starting mandrel 20 to minimize any deleterious mechanical affects resulting from the repeated heating and cooling resulting from the translation of deposition burner or burners 46. As deposition proceeds, the particulate material or soot fills the intersection point and creates a strong bond between the deposited particulate material or soot and the extending portion of handle 10. As will be understood by one familiar with the art, by providing proper deposition soot density, the deposited soot will gradually fill in the irregularities created by the presence of handle 10, outwardly extending protrusion 16 and the intersection between extending portion of handle 10 and starting mandrel 20. As will be further understood, since the outwardly extending protrusion 16 extends into porous soot preform 44 a substantially integral unit comprising handle 10, starting mandrel 20, and preform 44 will result, whereby removal of the integral handle after deposition will be impossible without damaging or destroying preform 44.

After deposition of particulate soot material to the extent desired to form preform 44 has been completed, starting mandrel 20 may be removed from the assembly by pulling it out through handle 10 leaving a central longitudinal aperture 52 as illustrated in FIG. 5. Integral handle 10 provides support, and a strong and rigid means for subsequent handling and processing. The ground glass joint portion of handle 10 is secured into a complimentary female ground glass joint member 54 to which is affixed an opposing hook 56. The joint is secured by means of a wire 58 which is disposed about hooks 18 and 56 so as to maintain the male and female portions of the ground glass joint engaged. Wire 58 is preferably a platinum wire which is suitable to withstand the temperatures involved and substantially immune from reaction with the materials involved, however, any suitable material may be employed. For example, a thin silica rod flame formed to engage hooks 18 and 56 by bending over said hooks is also suitable for maintaining the male and female portions of the ground glass joint engaged. The porous soot preform 44 illustrated in FIG. 5 may now be consolidated into a solid preform and the central longitudinal aperture 52 closed. It will be understood that the consolidation of preform 44 need not simultaneously include the closing of aperture 52, rather aperture 52 may be subsequently closed, if desired. As will be understood, consolidation of porous soot preform 44, closing aperture 52 and drawing the resulting consolidated structure into an optical waveguide may be performed during the same operation in a manner well understood in the art. In addition, when desired, a drying medium, such for example, as a chlorine containing gas may be flowed through the aperture in female ground glass joint member 54, handle 10 and longitudinal aperture 52 through porous soot preform 44 in a manner as illustrated in U.S. Pat. No. 4,125,388, which patent is hereby expressly incorporated by reference. Drying taught by said patent is accomplished before or during the consolidation step.

Figure 6:
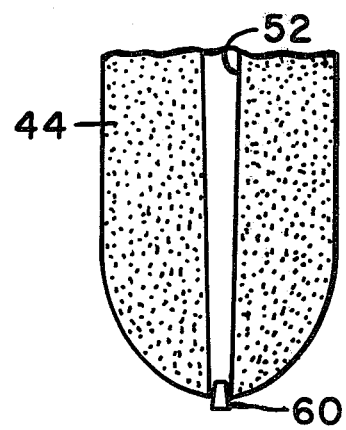
FIG. 6 is a fragmentary, elevational, cross-sectional view illustrating an embodiment of means for further handling and processing of a preform formed in accordance with the present invention.

When desired, the lower portion of aperture 52 may be fitted with a plug 60 to facilitate any gases flowing through aperture 52 to be transmitted through porous preform 44 as illustrated in FIG. 6. It will be understood that plug 60 may be a solid plug or one having an aperture or orifice of suitable size depending on the pressure that is desired to be maintained within aperture 52 and across the porous walls of preform 44.

For teaching of application of particulate material, consolidation, and drawing reference is hereby made to U.S. Pat. No. 3,659,915 to R. D. Maurer and P. C. Schultz, U.S. Pat. No. 3,711,262 to D. B. Keck and P. C. Schultz, U.S. Pat. No. 3,737,292 to D. B. Keck, P. C. Schultz and F. Zimar, U.S. Pat. No. 3,737,293 to R. D. Maurer, U.S. Pat. No. 3,775,075 to D. B. Keck and R. D. Maurer, U.S. Pat. No. 3,806,570 to J. S. Flammenbaum, P. C. Schultz, and F. W. Voorhees, U.S. Pat. No. 3,859,073 to P. C. Schultz, and U.S. Pat. No. 3,884,550 to R. D. Maurer and P. C. Schultz, all of which patents are hereby expressly incorporated by reference.

A specific example of forming an optical waveguide employing the integral handle of the present invention is as follows. An integral handle was constructed, and fitted with a polished alumina starting mandrel as hereinabove described having dimensions as heretofore described. Soot deposition was achieved by a burner employing natural gas and oxygen flame with a nitrogen inner shield and an oxygen outer shield. The core was constructed of $SiO_2$ while the cladding was 20% by weight $B_2O_3$ with the balance being $SiO_2$. The starting materials were $SiCl_4$, $BCl_3$ and $SiCl_4$ employing a delivery system as described hereinabove in the Aslami et al. application. The parameters for forming the porous soot preform was as set forth in Table I.

TABLE I

|  | Core (cc/min) | Cladding (cc/min) |
|---|---|---|
| Natural gas-deposition burner | 2850 | 2050 |

TABLE I-continued

| | Core (cc/min) | Cladding (cc/min) |
|---|---|---|
| Oxygen-deposition burner | 2100 | 830 |
| Nitrogen-inner shield | 360 | 360 |
| Oxygen-outer shield | 4800 | 3350 |
| Reactant bypass nitrogen | 360 | 360 |
| BCl₃ | 0 | 150 |
| SiCl₄ with carrier N₂ | 500 | 500 |
| Natural gas-auxilliary burner | 2400 | 2400 |
| Oxygen auxilliary burner | 1400 | 1400 |

Soot deposition continued until the core portion of the preform was approximately ⅞ of an inch while the total outside diameter of the porous soot preform was approximately 1 5/16 inches. The length of the preform was approximately 10 inches excluding the integral handle. Deposition time was approximately 150 minutes.

The porous soot preform so formed was suspended from a furnace drive mechanism and soaked in a helium and oxygen atmosphere for approximately 60 minutes, and thereafter driven into the furnace maintained at a temperature of 1830° C. The porous soot preform was consolidated into solid clear glass from which approximately 600 meters of fiber was drawn having a diameter of approximately 125μ and coated with silane. The resulting optical waveguide had a numerical aperture of approximately 0.167, an attenuation at 820 nm of 7.9 db/kilometer, an α value of 31.03, and a core diameter of approximately 73.85μ.

The integral handle constructed and utilized as hereinabove described provided excellent support for both the porous soot preform and the subsequently consolidated preform during all handling and processing steps. The porous soot preform and the consolidated preform remained in tact even in light of the stresses inherent in the composite due to the various materials involved.

Although the present invention has been described with respect to specific details of certain embodiments thereof, it is not intended that such details be limitations upon the scope of the invention except insofar as set forth in the following claims.

We claim:
1. An article comprising
a hollow tubular member defining a longitudinal aperture and having one end thereof tapered of diminishing wall thickness for approximately the length of said taper,
an outwardly extending protrusion disposed adjacent said one tapered end of said member,
means for providing a substantially gas-type connection to said member disposed at the end of said member opposite said one end whereby a gaseous medium may be flowed through said member, and
means intermediate said protrusion and said opposite end for securing said member to a source of gaseous medium.

2. The article of claim 1 wherein said means for providing a substantially gas-tight connection is a male ground glass joint member.

3. The article of claim 1 further comprising a starting mandrel disposed within said longitudinal aperture and spaced from the aperture defining walls of said tubular member, said starting mandrel extending beyond said one tapered end of said member.

4. The article of claim 3 further comprising shims disposed intermediate the outside surface of said starting mandrel and the longitudinal aperture defining walls of said hollow tubular member.

5. The article of claim 4 wherein said shims are disposed so as to permit the passage of a gaseous medium through said longitudinal aperture past said shims.

6. The article of claim 2 further comprising a female ground glass joint member disposed in an operative relationship with said male ground glass joint member.

7. The article of claim 6 further comprising means intermediate the ends of said female ground glass joint member for securing said female ground glass joint member to said male ground glass joint member.

8. The article of claim 7 wherein said means for securing said male ground glass member to said female ground glass member comprises a pair of protruding hooks.

9. The article of claim 8 further comprising a wire disposed about both of said hooks to maintain said male ground glass joint member and said female ground glass joint member in an operative relationship.

10. The article of claim 3 further comprising a coating of release agent applied over a portion of said starting mandrel and the adjacent portion of said hollow tubular member.

11. An article comprising
a first hollow tubular member defining a substantially longitudinal aperture and having one end thereof tapered and of diminishing wall thickness for the length of said taper,
an outwardly extending protrusion disposed adjacent said one tapered end of said first hollow tubular member,
a second hollow tubular member defining a substantially longitudinal aperture rigidly affixed to the end of said first member opposite said one end of said first hollow tubular member along the longitudinal axis thereof, and
means for providing a substantially gas-tight connection to the structure so formed disposed at the end of said second member opposite said one end of said first member, whereby a gaseous medium may be flowed through the structure so formed.

12. The article of claim 11 wherein said means for providing a substantially gas-tight connection is a male ground glass joint member.

13. The article of claim 11 further comprising a starting mandrel disposed within said longitudinal apertures defined by said first and second hollow tubular members and spaced from the aperture defining walls of said first and second tubular members, said starting mandrel extending beyond said one tapered end of said first tubular member.

14. The article of claim 13 further comprising shims disposed intermediate the outside surface of said starting mandrel and the longitudinal aperture defining walls of said second hollow tubular member.

15. The article of claim 14 wherein said shims are disposed so as to permit the passage of a gaseous medium through said longitudinal apertures past said shims.

16. The article of claim 12 further comprising a female ground glass joint member disposed in an operative relationship with said male ground glass joint member.

17. The article of claim 16 further comprising means intermediate the ends of said female ground glass joint member for securing said female ground glass joint member to said male ground glass joint member.

18. The article of claim 17 wherein said means for securing said male ground glass member to said female ground glass member comprises a pair of protruding hooks.

19. The article of claim 18 further comprising a wire disposed about both of said hooks to maintain said male ground glass joint member and said female ground glass joint member in an operative relationship.

20. The article of claim 13 further comprising a coating of release agent applied over a portion of said starting mandrel and the adjacent portion of said first hollow tubular member.

* * * * *